(12) United States Patent
Cramer et al.

(10) Patent No.: US 11,364,654 B2
(45) Date of Patent: Jun. 21, 2022

(54) INDIRECT ADDITIVE MANUFACTURING PROCESS FOR PRODUCING SIC—B4C—SI COMPOSITES

(71) Applicant: UT-Battelle, LLC, Oak Ridge, TN (US)

(72) Inventors: Corson L. Cramer, Knoxville, TN (US); Richard A. Lowden, Clinton, TN (US); Kinga A. Unocic, Knoxville, TN (US); Jacob W. McMurray, Clinton, TN (US); Amelia M. Elliott, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 99 days.

(21) Appl. No.: 16/717,356

(22) Filed: Dec. 17, 2019

(65) Prior Publication Data
US 2020/0189145 A1 Jun. 18, 2020

Related U.S. Application Data

(60) Provisional application No. 62/780,543, filed on Dec. 17, 2018.

(51) Int. Cl.
*B28B 1/00* (2006.01)
*B28B 17/00* (2006.01)
(Continued)

(52) U.S. Cl.
CPC .......... *B28B 1/001* (2013.01); *B28B 17/0063* (2013.01); *C04B 35/563* (2013.01);
(Continued)

(58) Field of Classification Search
CPC ... B28B 1/001; B28B 17/0063; C04B 35/563; C04B 35/565; C04B 35/632; C04B 38/0041; C04B 38/06
See application file for complete search history.

(56) References Cited

U.S. PATENT DOCUMENTS 4,346,049 A 8/1982 Coppola et al.
5,894,066 A 4/1999 Talmy et al.
(Continued)

FOREIGN PATENT DOCUMENTS

CN 108640687 A 10/2018

OTHER PUBLICATIONS

Aroati, S., et al. "Preparation of reaction bonded silicon carbide (RBSC) using boron carbide as an alternative source of carbon." Journal of the European Ceramic Society 31.5 (2011): 841-845. (Year: 2011).*

(Continued)

*Primary Examiner* — Karl E Group
*Assistant Examiner* — Cameron K Miller
(74) *Attorney, Agent, or Firm* — Scully, Scott, Murphy & Presser, P.C.

(57) ABSTRACT

A method for indirect additive manufacturing of an object constructed of boron carbide, silicon carbide, and free silicon, comprising: (i) producing a porous preform constructed of boron carbide and silicon carbide by an indirect ceramic additive manufacturing (ICAM) process in which particles of a powder mixture become bonded together with an organic binder, wherein the powder mixture comprises: a) boron carbide particles, and b) silicon carbide particles, wherein at least 80 vol % of the silicon carbide particles are larger than the boron carbide particles; and wherein the boron carbide and silicon carbide particles are each included in an amount of 40-60 wt. % of the powder mixture, provided that the foregoing amounts sum to at least 95 wt. %; (ii) subjecting the porous preform to a temperature of 500-900° C. to volatilize the organic binder; and (iii) infiltrating molten silicon into pores of the porous preform to produce the object.

19 Claims, 10 Drawing Sheets

(51) Int. Cl.
| | |
|---|---|
| C04B 35/563 | (2006.01) |
| C04B 38/00 | (2006.01) |
| C04B 35/565 | (2006.01) |
| C04B 35/632 | (2006.01) |
| C04B 38/06 | (2006.01) |
| B33Y 10/00 | (2015.01) |
| B33Y 30/00 | (2015.01) |
| B33Y 70/00 | (2020.01) |
| B33Y 80/00 | (2015.01) |

(52) U.S. Cl.
CPC .......... *C04B 35/565* (2013.01); *C04B 35/632* (2013.01); *C04B 38/0041* (2013.01); *C04B 38/06* (2013.01); *B33Y 10/00* (2014.12); *B33Y 30/00* (2014.12); *B33Y 70/00* (2014.12); *B33Y 80/00* (2014.12); *C04B 2235/386* (2013.01); *C04B 2235/3821* (2013.01); *C04B 2235/3826* (2013.01); *C04B 2235/428* (2013.01); *C04B 2235/5427* (2013.01); *C04B 2235/5436* (2013.01)

(56) References Cited

U.S. PATENT DOCUMENTS

| | | |
|---|---|---|
| 5,965,266 A | 10/1999 | Goujard et al. |
| 6,036,777 A | 3/2000 | Sachs |
| 7,287,587 B2 | 10/2007 | Reddy et al. |
| 9,376,348 B2 | 6/2016 | Johannessen et al. |
| 10,040,216 B2 | 8/2018 | Bai et al. |
| 2020/0308063 A1* | 10/2020 | Kienzle ................ C04B 35/565 |

OTHER PUBLICATIONS

Sahani, P., et al. "A Comparative Study on SiC—B 4 C—Si Cermet Prepared by Pressureless Sintering and Spark Plasma Sintering Methods." Metallurgical and Materials Transactions A 47.6 (2016): 3065-3076. (Year: 2016).*

Hayun, S., "Reaction-bonded boron carbide for lightweight armor: The interrelationship between processing, microstructure, and mechanical properties", American Ceramic Society Bulletin, 96(6):20-26, Aug. 2017.

Hayun, S., et al., "Static and dynamic mechanical properties of infiltrated B4C—Si composites", Materials Science and Engineering A, 487:405-409, (2008).

Moon, J., et. al., "Fabrication of functionally graded reaction infiltrated SiC—Si composite by three-dimensional printing (3DP™) process", Materials Science and Engineering A, 298:110-119, (2001).

Sahani, P., et. al., "A Comparative Study on SiC—B4C—Si Cermet Prepared by Pressureless Sintering and Spark Plasma Sintering Methods", Metallurgical and Materials Transactions A, 47A:3065-3076, Jun. 2016.

Thuault, A., et. al., "Processing of reaction-bonded B4C—SiC composites in a single-mode microwave cavity", Ceramics International, 39:1215-1219, (2013).

* cited by examiner

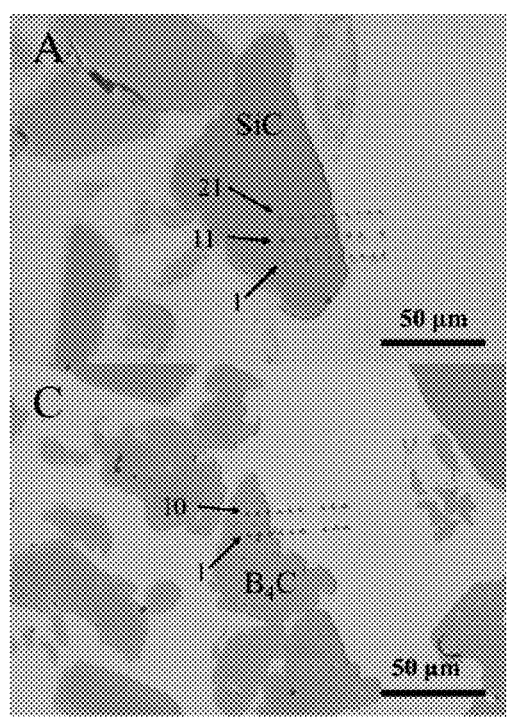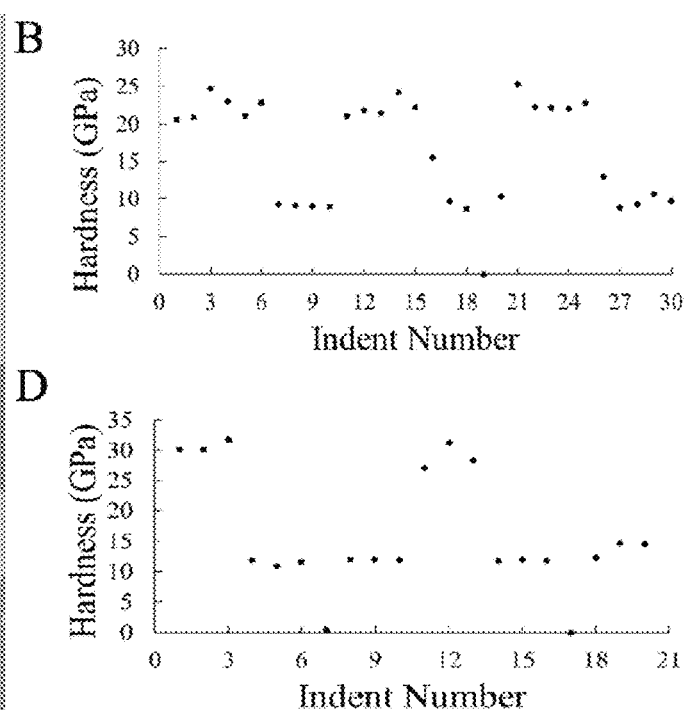
FIGS. 8A-8D

INDIRECT ADDITIVE MANUFACTURING PROCESS FOR PRODUCING SIC—B4C—SI COMPOSITES

CROSS REFERENCE TO RELATED APPLICATION

The present application claims benefit of U.S. Provisional Application No. 62/780,543, filed on Dec. 17, 2018, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to boron carbide and silicon carbide bonded ceramics, and more particularly, methods of additive manufacturing of such bonded ceramics.

BACKGROUND OF THE INVENTION

Boron carbide ($B_4C$) and silicon carbide (SiC) composites are used in many applications, such as aero-engine components, turbo pumps, armor, heat exchangers, fusion reactors, seal rings, and bearings because of their exceptional hardness, low density, excellent wear resistance, and good oxidation resistance. In armor applications, boron carbide and silicon carbide are well-suited material candidates due to their high hardness, which attenuates the penetration ability of projectiles. However, in large part due to the inability of these materials to sinter, much difficulty has been encountered in efforts to form complex shapes of fully dense reaction-bonded $B_4C$—SiC composites. Thus, a method that could produce any number of complex shapes of such composites, and do so at reasonable cost and time, would represent a significant advance in the art of $B_4C$—SiC composites.

SUMMARY OF THE INVENTION

The present disclosure is directed to methods for producing objects composed of a composite of boron carbide and silicon carbide and free silicon, wherein the objects may be of any of a variety of shapes. The method is further advantageous in that it is relatively straight-forward and can produce such objects in a very cost-effective manner. The method employs an indirect additive manufacturing (IAM) process, such as a binder jetting process, to form an initial porous preform constructed of boron carbide and silicon carbide, with a substantial portion of the silicon carbide particles being larger in size than the boron carbide particles, followed by debinding the porous preform at a temperature of 500-800° C. to produce a binder-free porous preform, with optional subsequent sintering of the porous preform, followed by infiltrating molten silicon into pores of the binder-free porous preform to produce the object composed of a composite of boron carbide and silicon carbide and free silicon.

More specifically, the method includes the following steps: (i) producing a porous preform constructed of boron carbide and silicon carbide by an indirect ceramic additive manufacturing (ICAM) process in which particles of a powder mixture containing boron carbide and silicon carbide particles become bonded together with an organic binder to construct the porous preform, wherein the powder mixture comprises: a) boron carbide particles having a size of at least 5 microns and no more than 120 microns, and b) silicon carbide particles having a size of at least 50 microns and no more than 500 microns, wherein at least 80 vol % of the silicon carbide particles are larger than the boron carbide particles; and wherein the boron carbide and silicon carbide particles are each included in an amount of 40-60 wt. % by weight of the powder mixture, provided that the foregoing amounts sum to at least 95 wt. %; (ii) subjecting the porous preform to a temperature of 500-800° C. to volatilize the organic binder to produce a binder-free porous preform; and (iii) infiltrating molten silicon into pores of the binder-free porous preform to produce the object constructed of boron carbide, silicon carbide, and free silicon.

In particular embodiments, the ICAM process is a binder jetting additive manufacturing process. When a binder jetting process is used, it produces the porous preform in step (i) by separately feeding the powder mixture and an organic binder into a binder jetting manufacturing device, and dispensing selectively positioned droplets of the organic binder from a printhead of the binder jet additive manufacturing device into a bed of the powder mixture to bind particles of the powder mixture with the organic binder to form the porous preform.

BRIEF DESCRIPTION OF THE FIGURES

FIG. 2A is an image of a printed SiC preform; FIG. 2B is an image of a SiC preform infiltrated with Si; FIG. 2C is an image of a $B_4C$—SiC preform; and FIG. 2D is an image of a $B_4C$—SiC preform infiltrated with Si.

FIGS. 8A-8D show nano-indents across the interfaces of each of the particles with the Si matrix as well as the hardness values. FIG. 8A shows indents across the SiC—Si interface; FIG. 8B shows the indent hardness values of the SiC—Si interface; FIG. 8C shows indents across the B$_4$C—Si interface; and FIG. 8D shows the indent hardness values of the B$_4$C—Si interface.

FIG. 9A shows how the crack propagation at the SiC—Si interface is deflected or blunted at the SiC particle. FIG. 9B shows how the crack propagation at the B$_4$C—Si interface is propagated into or through the B$_4$C particle.

DETAILED DESCRIPTION OF THE INVENTION

Figure 1:
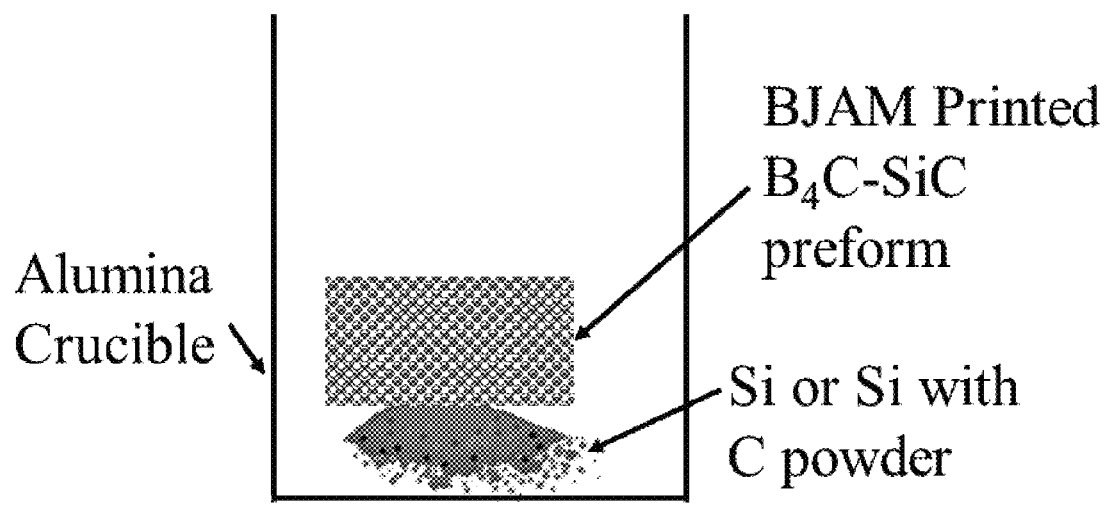
FIG. 1 provides a graphic showing an exemplary setup for infiltrating silicon into pores of a SiC—$B_4C$ preform.

The indirect ceramic additive manufacturing (ICAM) process described herein employs a powder mixture containing powders (particles) of two different compositions: boron carbide (B$_4$C) and silicon carbide (SiC). The foregoing powders are used in the ICAM process to construct a porous preform, as further discussed below. Both powders are preferably used in a purity of at least 99.0, 99.5, or 99.9%.

The boron carbide particles typically have a size of at least 5 microns and no more than 120 microns (i.e., in the range of 5-120 microns). In different embodiments, the boron carbide particles have a size of, for example, 5, 10, 15, 20, 25, 30, 35, 40, 45, 50, 60, 65, 70, 75, 80, 85, 90, 95, 100, 105, 110, or 120 microns, or a size within a range bounded by any two of the foregoing values (e.g., 5-120, 5-100, 5-75, or 5-50 microns). The silicon carbide particles typically have a size of at least 50 microns and no more than 500 microns (i.e., in the range of 50-500 microns). In different embodiments, the silicon carbide particles have a size of, for example, 50, 60, 70, 80, 90, 100, 120, 150, 180, 200, 250, 300, 350, 400, 450, or 500 microns, or a size within a range bounded by any two of the foregoing values (e.g., 50-500, 50-400, 50-300, 50-200, 100-500, 100-400, 100-300, or 100-200 microns).

The boron carbide and silicon carbide particles are each included in an amount of 40-60 wt. % (e.g., precisely or about 40, 45, or 50 wt. %) by weight of the powder mixture, provided that the foregoing amounts sum to at least or greater than 95, 96, 97, 98, or 99 wt. %. In some embodiments, boron carbide and silicon carbide are the only components of the powder mixture (i.e., they sum to 100 wt. %). In other embodiments, one or more additional components (e.g., elemental carbon, an inorganic oxide, another carbide, or a silicide) may be included in the powder mixture, generally in an amount of no more than or less than 5, 2, 1, 0.5, or 0.1 wt. % (which corresponds to the boron carbide and silicon carbide powder mixture being present in an amount of at least or more than 95, 98, 99, 99.5, or 99.9 wt. %, respectively). In some embodiments, any one or more of the above additional components are excluded.

Generally, the term "size," as used herein, refers to a distribution of particle sizes over a specified range of sizes, such as any of the possible size ranges provided above. In some embodiments, particles having a size outside of a specified range are excluded. For example, for a size range of 5-120 microns for boron carbide particles, boron carbide particles having a size over 120 microns may be excluded (i.e., 100 wt. % or 100 vol % of the particles are within the indicated size range). In other embodiments, at least or more than 75, 80, 85, 90, 95, 98, or 99 wt. % (or vol %) of the particles are within a specified size range, such as any of the size ranges provided above, which thus permits some amount of the particles (i.e., up to or less than 25, 20, 15, 10, 5, 2, or 1 wt. % or vol %, respectively) to reside outside of the indicated size range. The particle size may be further or alternatively expressed in terms of a size distribution parameter D, such as D$_{50}$, D$_{10}$, and D$_{90}$, as well known in the art. The D$_{50}$, D$_{10}$, or D$_{90}$ for each particle type may be selected from, for example, any of the specific exemplary particle size values provided above. In some embodiments, the boron carbide and silicon carbide particles independently have a D$_{50}$ of any of the exemplary particle sizes provided above (or range therein), respectively.

For purposes of the invention, at least 80% (or, e.g., at least 85%, 90%, 95%, 98%, 99%, or 100%) of the silicon carbide particles are larger than the boron carbide particles. In some embodiments, the D$_{50}$ and/or D$_{90}$ distribution parameter is higher for the silicon carbon particles than for the boron carbide particles. In other embodiments, at least or more than 50%, 55%, 60%, 65%, 70%, 75%, 80%, 85%, or 90% of the silicon carbide particles are at least two, three, four, five, six, seven, eight, nine, or ten times the size of the boron carbide particles.

In a first step, i.e., "step (i)," a porous preform constructed of boron carbide particles and silicon carbide particles bonded together with an organic binder is produced by an ICAM process. The ICAM process can be any of the indirect manufacturing processes known in the art capable of using ceramic or metal powder to construct a porous preform. The shape of the object being built can include any level of detail made possible by ICAM processes of the art. The ICAM process operates by bonding particles to each other with an organic binder to construct a porous preform that is subsequently debinded and optionally subsequently sintered. The ICAM process may be, for example, a binder jetting, lithography-based ceramic manufacturing (i.e., ceramic photolithography), or direct-ink-writing (DIW) process (also known as robocasting), all of which are well known in the art (see, e.g., U.S. Pat. No. 6,036,777 for binder jetting; S. Nohut et al., "Ceramic Additive Manufacturing via Lithography," *Ceramic Industry*, pp. 22-26, October 2018 for lithography-based ceramic manufacturing; and J. A. Lewis, *Adv. Funct. Mater.*, 16, 2193-2204 for DIW process). For purposes of the invention, the ICAM process does not include direct additive manufacturing processes, which typically rely on heat for welding (i.e., fusing or sintering) the particles together during the manufacturing (bonding) process. Some examples of direct additive manufacturing processes, which are excluded from the present process, include direct laser or melting processes well known in the art.

In particular embodiments, the ICAM process is a binder jetting process, as well known in the art. The binder jetting process is described in detail in, for example, U.S. Pat. Nos. 6,036,777, 10,040,216, and X. Lv et al., *Ceramics International*, 45(10), 12609-12624, July 2019, the contents of which are herein incorporated by reference in their entirety. In the binder jetting process, a powder mixture, as described above, is fed into a binder jetting manufacturing device (BJMD) as a build material. The powder is typically dispensed as a layer (bed) of build material on a vertically movable platform within the BJMD. An organic binder, either alone or admixed with a solvent, is separately fed into the BJMD and routed to a printhead positioned over the bed of powder mixture. The organic binder may be any of the binders well known in the art of binder jetting, such as a polymer (e.g., adhesive substance) or curable monomer. In particular embodiments, the organic binder is or includes a polyol-based (e.g., glycol-based) binder, phenolic binder (e.g., phenolic resin), or furfuryl-based binder (e.g., furfuryl alcohol-based binder). The organic binder may or may not also include crosslinkable functional groups. Polymers containing crosslinkable groups are well known in the art, such as generally described in U.S. Pat. No. 7,287,587, the contents of which are herein incorporated by reference. The crosslinkable polymer may be, for example, any of the numerous epoxide-containing crosslinkable polymers known in the art; or, for example, any of the formaldehyde-containing polymers, such as a phenol-formaldehyde, formaldehyde-amine, or phenol-formaldehyde-amine polymer, such as described in A. Chernykh et al., *Polymer*, vol. 47, no. 22, pp. 7664-7669, 2006, the contents of which are herein incorporated by reference; or, for example, any of the crosslinkable polymers based on benzocyclobutene, such as described in K. A. Walker et al., *Polymer*, vol. 35, no. 23, pp. 5012-5017; or, for example, any of the vinyl ester resins and unsaturated polyester resins known in the art, such as described in S. Jaswal et al., *Rev. Chem. Eng.*, 30(6), pp. 567-581, 2014.

Based on instructions provided by a computer program, as generally provided by a computer-aided manufacturing (CAM) software package, the printhead is directed to dispense selectively positioned droplets of the binder onto the powder bed to form a first layer of the article being built. The printhead can be an ink jet printhead, as well known in the art. Thus, the droplets of the binder can be precisely positioned in various locations on the powder bed to form a first layer of the article being built. As well known in the art of binder jetting, once a first layer of the article is built, the platform holding the powder bed is lowered by an amount equivalent to a layer thickness. A subsequent layer of the object is built by selectively depositing a second set of selectively positioned droplets of the binder. The platform holding the powder bed is then lowered again by another layer thickness, and the process is continued until a preform having the shape of the object to be built is produced. For purposes of the present invention, the preform produced by the ICAM process is porous and is constructed of particles of the powder mixture described above bonded together with the organic binder. The above described binder jetting process is meant to be exemplary, and numerous modifications of the above described process can be made. Generally, the SiC—$B_4C$ preform, produced as above, possesses at least or above 45, 50, 55, 60, or 65% theoretical density (TD).

After producing the porous preform constructed of boron carbide particles and silicon carbide particles bonded with organic binder, the porous preform is subjected to a debinding step, i.e., "step (ii)," in which the porous preform is subjected to a temperature of 500-800° C., 500-850° C., or 500-900° C. to volatilize the organic binder to produce a binder-free porous preform. The term "binder-free" indicates that no organic binder remains in the porous preform after the debinding step, which occurs most efficiently when using hydrogen and argon gas mixes. In different embodiments, the debinding step is conducted at a temperature of, for example, 500, 525, 550, 575, 600, 625, 650, 675, 700, 725, 750, 775, 800, 825, 850, 875, or 900° C., or a debinding temperature within a range bounded by any two of the foregoing values (e.g., 500-900° C., 500-800° C., 500-700° C., or 575-775° C.).

Typically, the porous preform is heated gradually either to reach a debinding temperature from a lower temperature, or to gradually increase in temperature within the debinding temperature range, or both. The gradual increase in temperature is defined by a rate of temperature increase (i.e., increasing temperature gradient). The rate of temperature increase may be, for example, 1° C./min, 2° C./min, 5° C./min, 10° C./min, 15° C./min, or 20° C./min, or a rate of temperature increase within a range bounded by any two of the foregoing values (e.g., 1-20° C./min, 2-20° C./min, or 5-15° C./min). In a first embodiment, the porous preform transitions abruptly from room temperature (i.e., at the end of step (i) when the porous preform is constructed) directly to a debinding temperature within the above debinding temperature range, and the porous preform may be maintained at the debinding temperature for a specified period of time (e.g., 0.5, 1, 1.5, or 2 hours) or may be gradually elevated in temperature to a second temperature within the debinding temperature range (and may or may not be maintained at the second temperature). For example, the porous preform may be at a temperature of about 25° C. (room temperature) at the end of step (i) and then placed in an oven pre-heated to a temperature of 500° C. or 600° C. in step (ii), and the porous preform may be maintained at 500° C. or 600° C. for a suitable time period and/or elevated to a second debinding temperature (e.g., 650, 700, 750, or 800° C.) and maintained at the second temperature for a suitable time period. Although the foregoing embodiment is possible, it is less desirable than a gradual increase in temperature, since a sudden increase in temperature will likely introduce physical defects (e.g., cracking) into the preform. Thus, in a second embodiment, the porous preform transitions gradually from room temperature (i.e., at the end of step (i) when the porous preform is constructed) to a debinding temperature within the above debinding temperature range, and the porous preform may be maintained at the debinding temperature for a specified period of time or may be gradually elevated in temperature to another temperature within the debinding temperature range. For example, the porous preform may be at a temperature of about 25° C. at the end of step (i) and then placed in an oven not yet preheated (i.e., at room temperature) or pre-heated to a mild temperature of 50° C., and the temperature of the oven gradually increased to a debinding temperature of 500-800° C. or 500-900° C. or higher (wherein one or more debinding temperatures may be maintained for a suitable amount of time).

In some embodiments, the volatilization of the organic binder in step (ii) results in substantially or absolutely no residual carbon formed as a result of decomposition of the organic binder. The substantial absence of a carbon residue may be achieved by selection of a lower carbon-containing (higher oxygen-containing) organic binder and/or the conditions employed in step (ii). For example, in some embodiments, step (ii) is conducted in an atmosphere containing hydrogen ($H_2$) gas, typically as 1-5 vol % hydrogen admixed with argon. In some embodiments, the volatilization of the organic binder in step (ii) results in residual carbon (e.g., 0.001-0.05 wt. % by weight of the subsequent infiltrated silicon) formed as a result of decomposition of the organic binder. Where residual carbon is desired, an inert atmosphere (e.g., argon) is used, without hydrogen. The formation of residual carbon for additional silicon wetting and/or SiC formation may be further promoted by use of a high-carbon type of binder, such as any of the phenolic-containing polymers described earlier above. Notably, the residual carbon will generally help silicon (Si) infiltrate uniformly into preforms and react during subsequent silicon infiltration, as further discussed below, to produce more silicon carbide (SiC), in accordance with the phase diagram (e.g., Hayun et al., *Journal of the European Ceramic Society*, 30(4), 1007-1014, 2010).

In some embodiments, after producing the porous preform by the binder jetting or other process employing an organic binder in step (i), and before the debinding step (ii), the porous preform may be subjected to a curing step to fully vaporize solvents and/or to at least partially vaporize (decompose) or cure the organic binder. The curing step subjects the porous preform to one or more conditions that induce decomposition or crosslinking of the organic binder. The curing condition may entail exposure of the preform to, for example, heat, high-energy electromagnetic radiation (e.g., ultraviolet), or chemically reactive substance incorporated into the preform, which works over time and that may be further activated by exposure to heat or electromagnetic radiation (e.g., ultraviolet or x-ray). Generally, when heat is employed, the curing temperature is below the melting point of the organic binder or metal powder. In some embodiments, and depending on the chemical composition of the organic binder and powder, the curing temperature is at least 30° C., 40° C., 50° C., or 60° C. and up to 80° C., 100° C., 120° C., 150° C., 180° C., 200° C., 220° C., or 250° C., or within a range between any two of the foregoing temperatures. In the case where the organic binder is admixed with a solvent, a separate drying step (e.g., 100° C. maintained for at least 1 hour) may be employed before the curing step or as part of the curing step to remove the solvent.

In some embodiments, after the debinding step (ii) and before step (iii), the resulting binder-free porous preform is subjected to a sintering step, which may herein be referred to as step (ii-a). In other embodiments, a sintering step is omitted. As well known in the art, sintering can be achieved by subjecting the porous preform to a suitably elevated temperature, but below the melting point of the powder, at which the particles in the powder become fused. Preferably, for purposes of the invention, the sintering process results in sufficient fusing to result in a robust (i.e., infrangible) object constructed of the powder. The sintering process typically employs a temperature within a range of 1800–2200° C. to produce a sintered porous preform. In different embodiments, the sintering temperature is, for example, 1800° C., 1850° C., 1900° C., 1950° C., 2000° C., 2050° C., 2100° C., 2150° C., or 2200° C., or a temperature within a range bounded by any two of the foregoing values.

In some embodiments, the binder-free porous preform, as produced in step (ii), is first cooled to a lower temperature, such as room temperature, before being subjected to a sintering temperature. In a first embodiment, the binder-free porous preform transitions abruptly from room temperature or a debinding temperature to a sintering temperature, and the porous preform may be maintained at the sintering temperature for a specified period of time (e.g., 0.5, 1, 1.5, or 2 hours) or may be gradually elevated in temperature to a second higher sintering temperature within the sintering temperature range (and may or may not be maintained at the second temperature). For example, the binder-free porous preform may be at a temperature of about 25° C. (room temperature) after step (ii) and then placed in an oven pre-heated to a sintering temperature, and the binder-free porous preform may be maintained at the sintering temperature for a suitable time period and/or elevated to a second sintering temperature and maintained at the second temperature for a suitable time period. Although the foregoing embodiment is possible, it is less desirable than a gradual increase in temperature, since a sudden increase in temperature will likely introduce physical defects (e.g., cracking) into the preform. Thus, in a second embodiment, the binder-free porous preform transitions gradually from room temperature or a debinding temperature of step (ii) to a sintering temperature within the above sintering temperature range, and the binder-free porous preform may be maintained at the sintering temperature for a specified period of time or may be gradually elevated in temperature to another sintering temperature within the sintering temperature range. For example, in some embodiments, the porous preform may be at a temperature of about 25° C. after step (ii) and then placed in an oven not yet preheated (i.e., at room temperature) or pre-heated to a mild temperature of 50° C.-250° C. (which may function as a curing step), and the temperature of the oven gradually increased to a debinding temperature of 500-900° C. or higher (wherein one or more debinding temperatures may be maintained for a suitable amount of time), followed by further gradual increasing of the temperature to a sintering temperature (wherein one or more sintering temperatures may be maintained for a suitable amount of time, as discussed above).

After the debinding step or sintering step, the resulting binder-free (and optionally, sintered) porous preform is subjected to a silicon infiltrating step, which may be referred to as step (iii). In the silicon infiltrating step, molten silicon is infiltrated (i.e., impregnated, permeated, or diffused) into pores of the binder-free porous preform. Once the silicon is infiltrated into pores of the binder-free porous preform, the object constructed of boron carbide, silicon carbide, and free silicon is produced. Any method capable of infiltrating molten silicon into pores of a material may be used. In order for the silicon to be molten and diffuse into pores, the silicon (and porous preform) needs to be at a temperature at or above the melting point of silicon of 1414° C. Typically, the molten silicon is at a temperature of at least or above 1430, 1440, or 1450° C. when infiltrating. In different embodiments, the molten silicon is at a temperature of 1450, 1500, 1550, 1600, 1650, 1700, 1750, 1800, 1850, 1900, 1950, or 2000° C., or a temperature within a range bounded by any two of the foregoing values (e.g., 1450° C.-1700° C.) when infiltrating into pores of the preform. A higher temperature (e.g., 2200° C. or 2500° C.) can theoretically be used; however, for purposes of the invention, a temperature above 1900 or 2000° C. provides little if any additional benefit. Theoretically, the silicon and porous preform can be at a temperature up to or below the boiling point of silicon (3265° C.) and below the melting temperature of SiC (2730° C.) and $B_4C$ (3036° C.) during the infiltrating step. The silicon is preferably included in an amount substantially equivalent in volume to the pore space present in the binder-free porous preform. By using an amount of silicon substantially equivalent in volume to the pore space, the full pore space will become occupied with silicon without a silicon overhang. Typically, the infiltrating step is conducted in an inert gas (e.g., argon), which may include an amount of hydrogen gas (e.g., 1, 2, 3, 4, or 5 vol %), as described above for the debinding step. It may also be conducted in a vacuum of $10^{-2}$-$10^{-5}$ Torr.

In particular embodiments, the infiltrating step (iii) includes resting the binder-free porous preform on a bed of silicon powder, while the binder-free porous preform and bed of silicon powder are within a temperature-controlled enclosure, and raising the temperature of the enclosure to at least the melting of silicon (e.g., at least or above 1430° C., 1440° C., or 1450° C.) during the infiltrating process to result in melting of the silicon powder and infiltration of the silicon into pores of the binder-free porous preform by capillary action. The silicon may also rest on top of the part or in contact with a sacrificial runner. The preforms may also be dipped into a bath of molten silicon. Typically, the binder-free porous preform and silicon powder are gradually heated, starting at a temperature below the melting point of silicon (e.g., room temperature or debinding temperature), at any suitable rate of temperature increase, as provided above, such as, for example, 1° C./min, 2° C./min, 5° C./min, 10° C./min, 15° C./min, or 20° C./min, to reach a temperature above the melting point of silicon (i.e., any of the exemplary infiltrating temperatures provided above). If a sintering step is included, the sintered porous preform is typically cooled to a temperature below the melting point of silicon (e.g., room temperature) before being placed on a bed of silicon, with temperature gradually increasing to a temperature above the melting point of silicon. To permit sufficient time for the silicon to infiltrate into all pores of the binder-free porous preform, the preform and bed of silicon should be maintained at one or more temperatures above the melting point of silicon for a period of at least ore more than 30, 45, 60, 90, 120, 150, or 180 minutes. In some embodiments, carbon is excluded from the bed of silicon powder.

After the pores of the preform have been completely infiltrated with silicon, the resulting object is constructed of particles of boron carbide and silicon carbide fused together, as described above, along with free silicon (i.e., unreacted silicon) in the interstitial (pore) spaces. Thus, at the end of the infiltrating step, the porous preform has been converted to a non-porous object. The resulting silicon-infiltrated object is then cooled to result in solidification of the silicon in the porous preform. The resulting non-porous object generally includes a ternary phase containing boron, silicon, and carbon, typically as a rim structure surrounding the $B_4C$ particles. Generally, by virtue of the use of a difference in particle sizes (i.e., larger SiC particles compared to $B_4C$ particles), a greater packing of the particles is achieved, which results in a high density of at least or greater than 2.0, 2.2, or 2.5 g/cm$^3$ for the completed part infiltrated with silicon and cooled to room temperature.

Examples have been set forth below for the purpose of illustration and to describe certain specific embodiments of the invention. However, the scope of this invention is not to be in any way limited by the examples set forth herein.

EXAMPLES

Binder Jet Printing of SiC and SiC—$B_4C$ Preforms and Subsequent Si Infiltration SiC powder (99.9% purity, stoichiometric, 150 µm average grain size) and $B_4C$ powder (99.9% purity, stoichiometric, 70 µm average grain size were used as starting powders. Size distributions were measured by measuring the volume distribution. The SiC particles had a particle size distribution as follows: a $D_{50}$ of 181.14 µm, a $D_{10}$ of 144.4 µm, and a $D_{90}$ of 207.7 where $D_{XX}$ is the size of 50, 10 and 90% of total size distribution. The $B_4C$ particles had a particle size distribution as follows: a $D_{50}$ of 68.94 µm, a $D_{10}$ of 88.09 µm, and a $D_{90}$ of 51.43 µm. Silicon metal powder (99.9% purity, <44 µm average grain size mesh particle size) from was used for infiltration purposes. A solvent-based organic binder (glycol-based, commercial solvent binder) was used for binding all printed parts.

Printed parts were achieved with a blend of SiC and $B_4C$ powders in a 1:1 ratio by weight. The two powders were printed using an ExOne® X1-Lab printer. Binder jet print settings were varied from typical conditions to accommodate the materials being processed as follows: the ratio of feed powder to layer was 2:1, the powder spread velocity was 1 mm/s, the layer thickness (200 µm) was large to suit the 200 µM particle size. The binder saturation and powder packing for the SiC were 85% and 55%, respectively. The sample preforms were coupons that measured 15×15×5 mm. Geometries were checked by measuring the dimensions and comparing to the CAD model dimensions. Curing and debinding were conducted as earlier described (C. L. Cramer et al., Additive Manufacturing, vol. 28, pp. 333-343, August 2019).

In order to ensure full density with no excess Si infiltrant, the weight of Si used corresponded to the measured porosity in the green coupon coupled with density of Si. The calculation of the amount of void space in the preform was based on the print density of the two powders and the theoretical density of SiC or SiC—$B_4C$ preform. The SiC and SiC—$B_4C$ preforms were made to rest on top of the powder, as shown schematically in FIG. 1. The preform and Si powder were then heated at a rate of 10° C./min in a crucible to 1,450° C. and held for 60 minutes in flowing Ar/4% H2. The samples were then furnace cooled, after which the composites were prepared and characterized for shape retention, hardness, and microstructure.

Characterization

The specimen microstructures were analyzed with a scanning electron microscope in secondary and backscattered electron imaging modes. Geometric, Archimedes, and areal densities were measured when appropriate. Geometric and Archimedes densities were determined by measuring the part dimensions, dry mass, and submerged mass. Areal densities were measured using ImageJ software on SEM cross sections. Composite densities were also calculated via the rule of mixtures. For imaging large cross sections, optical images were taken using a Leica DM4000 M LED system using stitching and mosaic mode. Phase composition was determined by x-ray diffraction (XRD) using a diffractometer with Mo K-α radiation (λ=0.709319 Å). The operating parameters were 55 kV and 40 mA, with a 20 step size of 0.0167°/s. The XRD patterns were analyzed using available software and the ICDD PDF database (ICDD, PDF-4+ 2018, International Centre for Diffraction Data). Vickers hardness measurements were performed using a LECO LM 110AT apparatus under a load of 0.5 kgf. Chemical analysis of the powders and the printed parts were performed to gain insight on the carbon gained from the binder.

Results

The chemical analysis of the SiC powder, printed SiC, SiC—$B_4C$ powder, and printed SiC—$B_4C$ are shown in Table 1. This was done to quantify the amount of carbon left behind by the binder because typically more carbon leads to better Si infiltration. The binder used in the binder jetting process typically has a residual carbon of less than 2%. For the printed SiC parts, the carbon content decreased after debinding, so the addition of $B_4C$ allowed for a carbon increase compared to prints without $B_4C$.

TABLE 1

Chemical analysis of samples showing the wt. % of elements of powder before printing and after printing and debinding.

| Element | SiC powder | Printed and debinded SiC | $B_4C$-SiC powder blend | Printed and debinded $B_4C$-SiC |
|---------|------------|--------------------------|-------------------------|--------------------------------|
| Si | 69.3 ± 1.4 | 71.1 ± 1.4 | 29.4 ± 0.6 | 28.7 ± 0.6 |
| C  | 29.6 ± 0.6 | 29.0 ± 0.6 | 24.9 ± 0.5 | 26.3 ± 0.5 |
| B  | —          | —          | 45.7 ± 0.9 | 45.0 ± 0.9 |

Figures 2A, 2B, 2C, 2D:
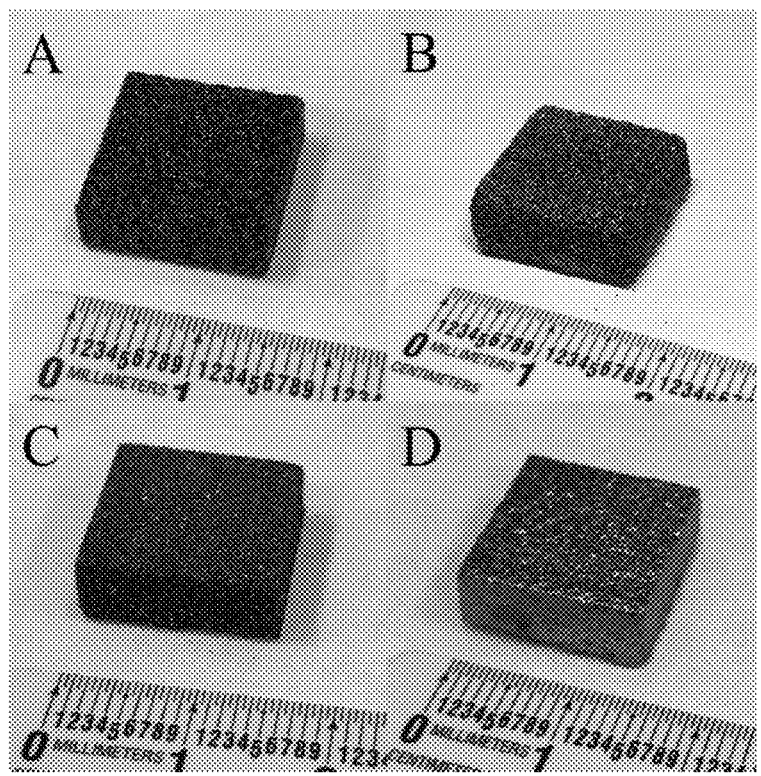
FIGS. 2A-2D show macro images of printed SiC and $B_4C$—SiC preforms and their infiltrated composites.

FIGS. 2A-2D show macro images of printed SiC and $B_4C$—SiC preforms and their infiltrated composites. FIG. 2A is an image of a printed SiC preform; FIG. 2B is an image of a SiC preform infiltrated with Si; FIG. 2C is an image of a $B_4C$—SiC preform; and FIG. 2D is an image of a $B_4C$—SiC preform infiltrated with Si. The SiC was printed to 48% theoretical density (TD), and the $B_4C$—SiC preform was printed to 55% TD (see Table), which is relatively high for the binder jet process. This difference is believed to be primarily due to the difference in particle sizes between the $B_4C$ and SiC, giving the blend a bimodal-sized particle distribution, where the smaller $B_4C$ particles pack into porosity created by the larger SiC particles. As further discussed below, the shape retention is significantly different with these samples. The SiC infiltrated with Si nearly crumbles after processing, while the $B_4C$—SiC blend infiltrated with Si is fully bonded. As such, further studies on the SiC—Si composite were not possible, and this is likely due to the debinding atmosphere removing carbon from the surface of SiC particles, which significantly impedes the wetting of the SiC with molten Si. The consolidation of SiC—$B_4C$—Si is promising because the $B_4C$ permitted more carbon retention during debinding. Further, the Si has higher wettability into these preforms as evidenced by the macro images in FIGS. 2A-2D where the Si appears to fully infiltrate the SiC—$B_4C$—Si preform up to and including "sealing" the surface (note: the shiny lustrous appearance of the samples in FIG. 2D). In contrast, FIG. 2B shows a matted, dull, rough, porous particulate surface (viz., not infiltrated).

TABLE 2

Table of geometric properties of preforms and composites after each processing step.

| | Printed SiC preform | Printed SiC-$B_4C$ preform | Infiltrated SiC-Si composite | Infiltrated $B_4C$-SiC-Si composite |
|---|---|---|---|---|
| Dimensions (mm) | 15.2 × 15.1 × 5.1 | 15.1 × 15.1 × 5.1 | 15.2 × 15.1 × 5.1 | 15.2 × 14.9 × 5.1 |
| Density (g/cm$^3$, %TD) | 1.57, 48 | 1.54, 55 | n/a | 2.5, 98.4 |

Figure 3:
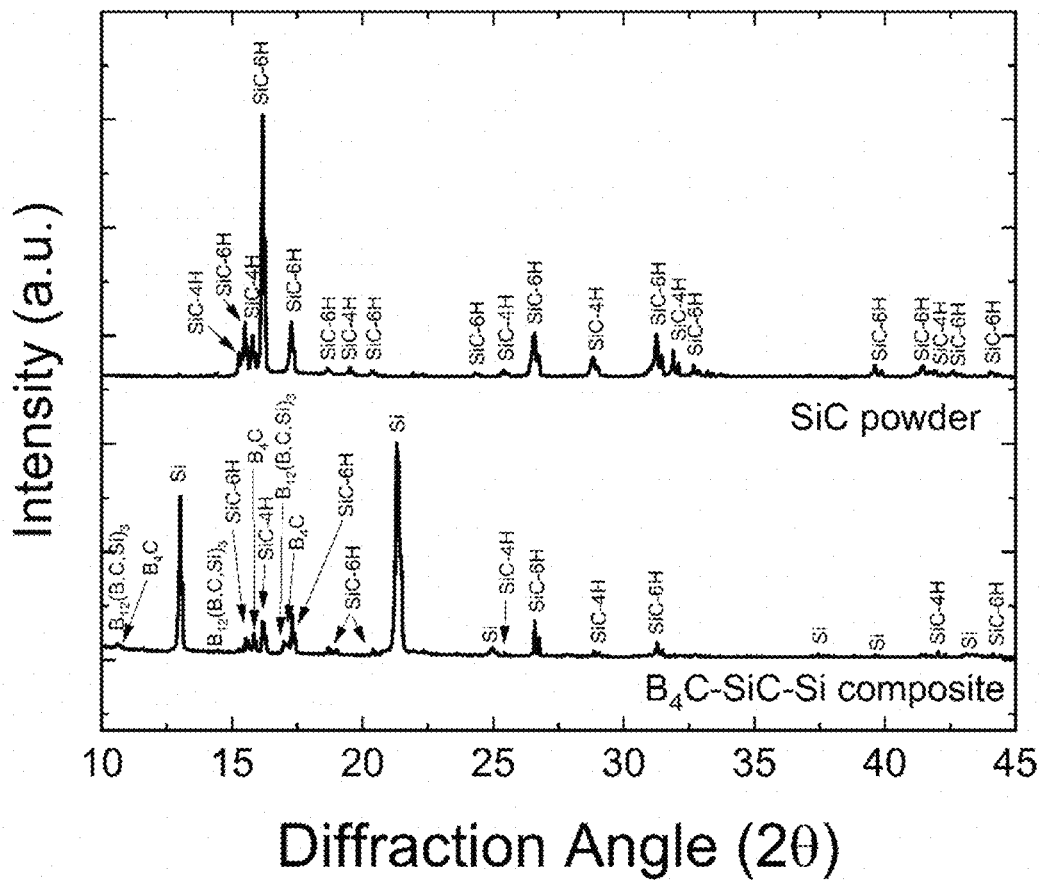
FIG. 3 shows XRD patterns of the SiC powder and the SiC—$B_4C$—Si composite.

FIG. 3 shows XRD patterns of the SiC powder and the SiC—$B_4C$—Si composite. The powder had two types of SiC polymorphs, 4H and 6H. The results show that the SiC powder is mostly 6H polytype, and this can vary from different powder sources. When processing the SiC with the $B_4C$ addition and silicon melt infiltration, the amount of 4H in the composite decreased, converting to 6H during processing. The composite also contained $B_4C$, a ternary phase ($B_{12}(B, C, Si)_3$), and residual free Si. The $B_4C$ has likely reacted with Si to form this ternary phase.

Figures 4A, 4B:
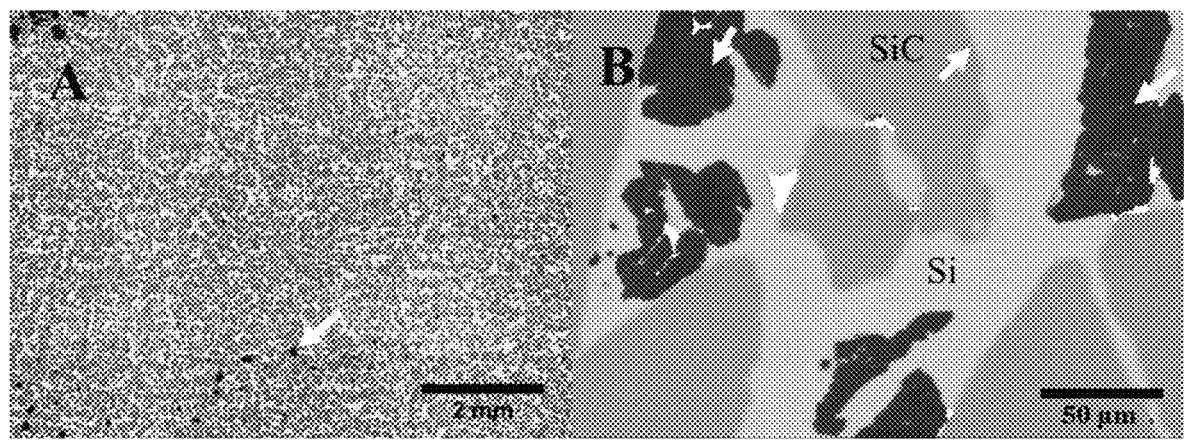
FIGS. 4A and 4B show optical and backscatter mode SEM images, respectively, of cross-sections of the SiC—$B_4C$—Si composite.

FIGS. 4A and 4B show optical and backscatter mode SEM images, respectively, of cross-sections of the SiC—$B_4C$—Si composite. In the optical image in FIG. 4A, the black regions (pointed out with a white arrow) are pores, and the light gray regions are the ceramic particles; the white regions are Si. The density was high because there are few pores, which aligns with the measured density in Table 2.

The amount of ceramic phase was measured as 57%, which is slightly higher than the bulk measurement above in Table 2. Also, the images show that the ceramic phases are dispersed well among the Si. The SEM image (backscatter mode) in FIG. 4B shows the phases of $B_4C$, SiC and Si. In FIG. 4B, the $B_4C$ has a slightly darker shade (pointed out with an arrow) and a lighter shade, where the lighter shade is the ternary phase recognized from XRD. This outer rim region, or reaction zone, is also seen in other reaction bonded $B_4C$—SiC—Si composites (e.g., S. Aroati et al., *J. Eur. Ceram. Soc.*, 31(5), 841-845, May 2011. There is also a lighter rim (arrow) around the SiC particles, which is possibly an edge effect or a diffusion zone of Si—B—C. There is no SiC platelet formation, and the bright white shades are Fe contamination.

Figure 5A:
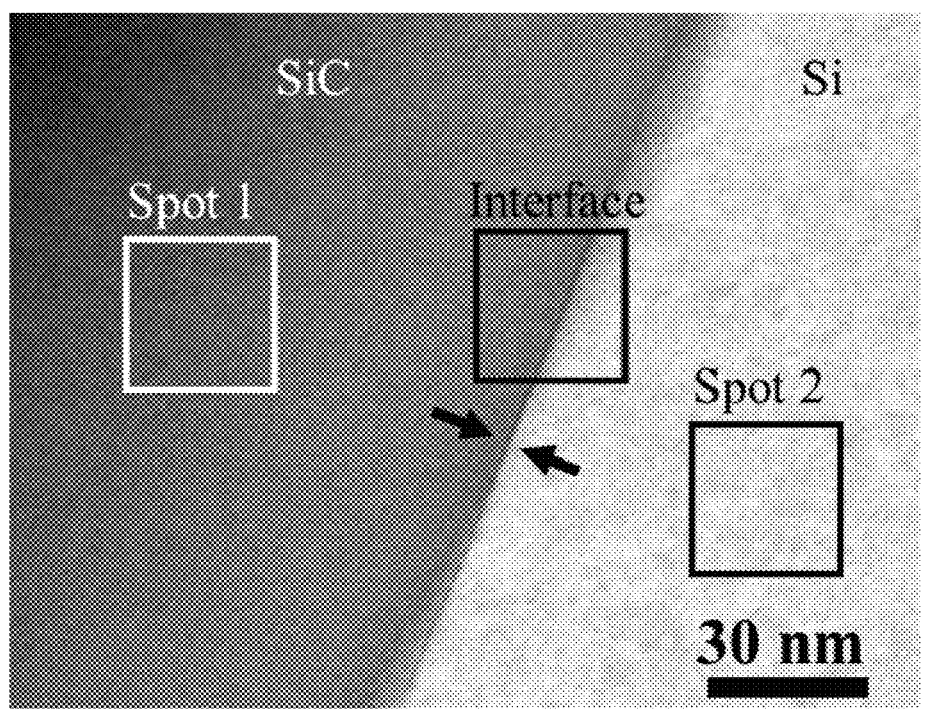
FIG. 5A is a bright field scanning transmission electron microscope (STEM) section of a SiC particle and Si interface that was milled out with a focused ion beam.
Figure 5B:
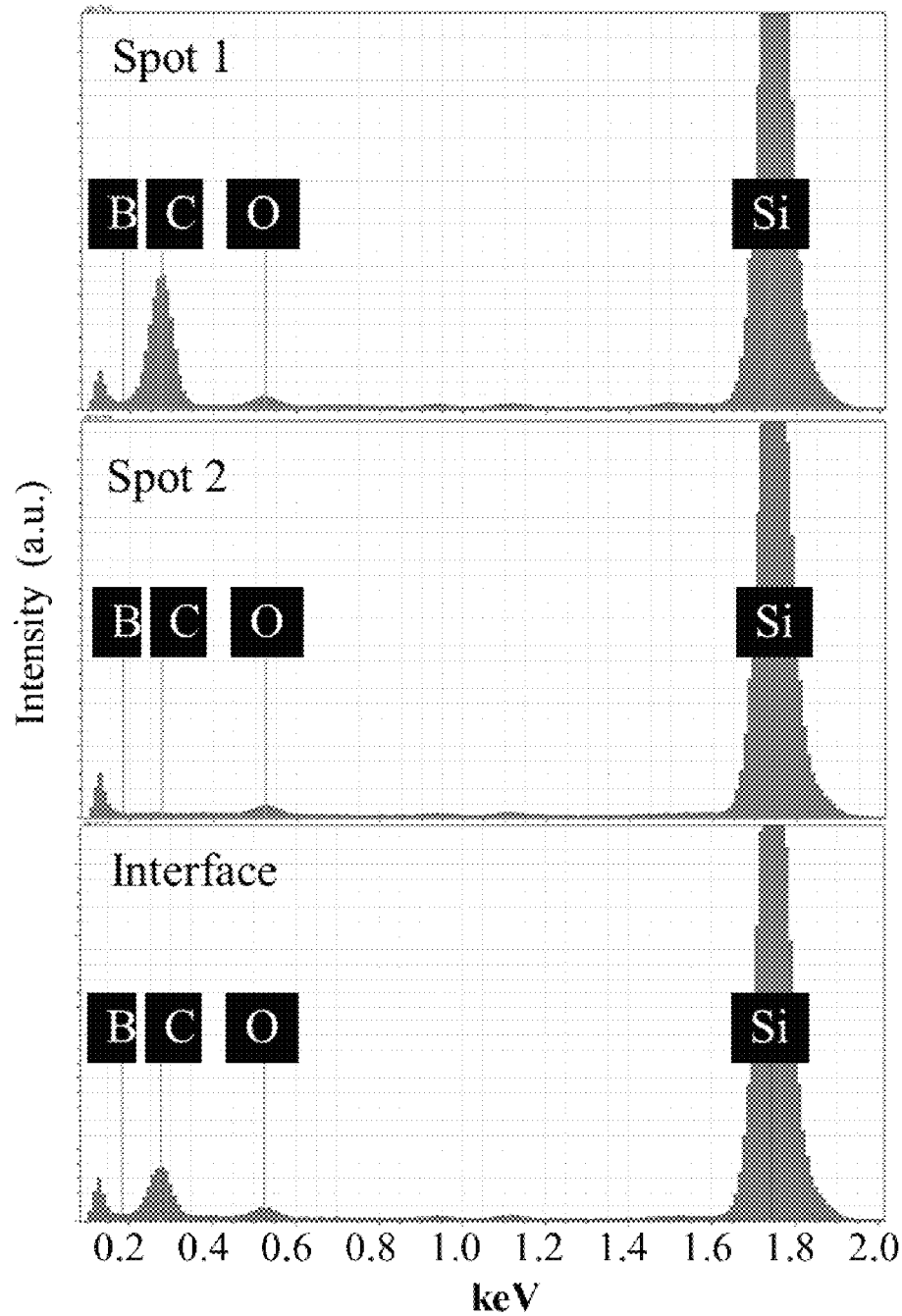
FIG. 5B shows EDS maps and scans of three locations (two spots and an interface) indicated in the STEM image.

FIG. 5A is a bright field scanning transmission electron microscope (STEM) section of a SiC particle and Si interface that was milled out with a focused ion beam. FIG. 5B shows EDS maps and scans of three locations (two spots and an interface) indicated in the STEM image. Si and carbon were separated, which indicates an interface of SiC and Si. There is no boron (B) at the interface nor in the Si, and the carbon (C) content decreases abruptly across the interface from SiC into Si. The interface appears intimate. This suggests that C from $B_4C$ plays a larger role than the B in assisting the Si infiltration into SiC. Also, there appears to be less Si content in the SiC toward the interface, which suggests that the edges of the SiC particles may have impurities and sub-stoichiometry.

Figures 6A, 6B, 6C:
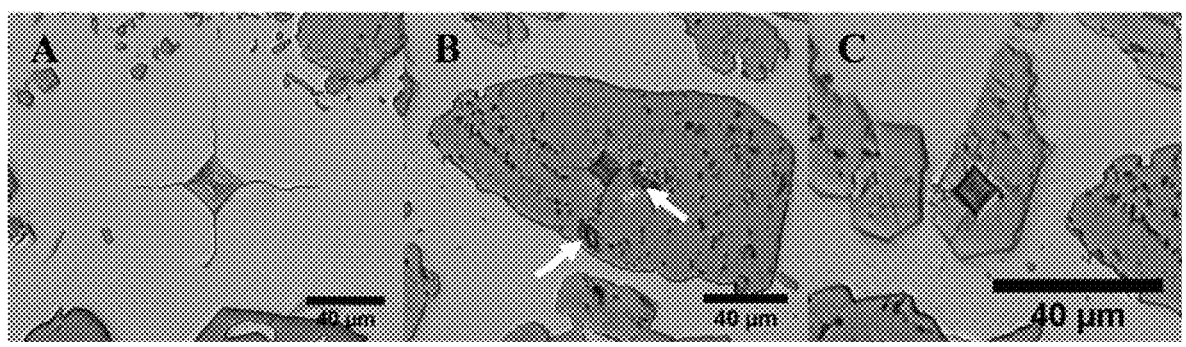
FIGS. 6A-6C show Vickers microhardness indentations (four-sided pyramid) on the SiC—$B_4C$—Si composite in the following three locations: (i) in the Si matrix (FIG. 6A), (ii) in a SiC particle (FIG. 6B), and (iii) in a $B_4C$ particle (FIG. 6C).

FIGS. 6A-6C show Vickers microhardness indentations (four-sided pyramid) on the SiC—$B_4C$—Si composite in the following three locations: (i) in the Si matrix (FIG. 6A), (ii) in a SiC particle (FIG. 6B), and (iii) in a $B_4C$ particle (FIG. 6C). Each phase of the composite was indented individually because the sizes of the indentations for the ASTM standard were not large enough to capture multiple phases at once. The indentation induced cracking in each phase, as shown in FIGS. 6A-6C. The hardness values for the matrix and two reinforcements are shown in Table 3 (below) where the Vickers number is given as well as a converted value (to convert from Vickers hardness to GPa, a simple dimensional analysis with gravity is performed). $B_4C$ was observed to be harder than SiC, and SiC was observed to be harder than the Si matrix material, in accordance with the known hardnesses of these compositions. The values of the particles were near the bulk values of the individual materials, even though there were some surface impurities or pores in the ceramic particles, as pointed out with arrows.

Figures 7A, 7B, 7C, 7D:
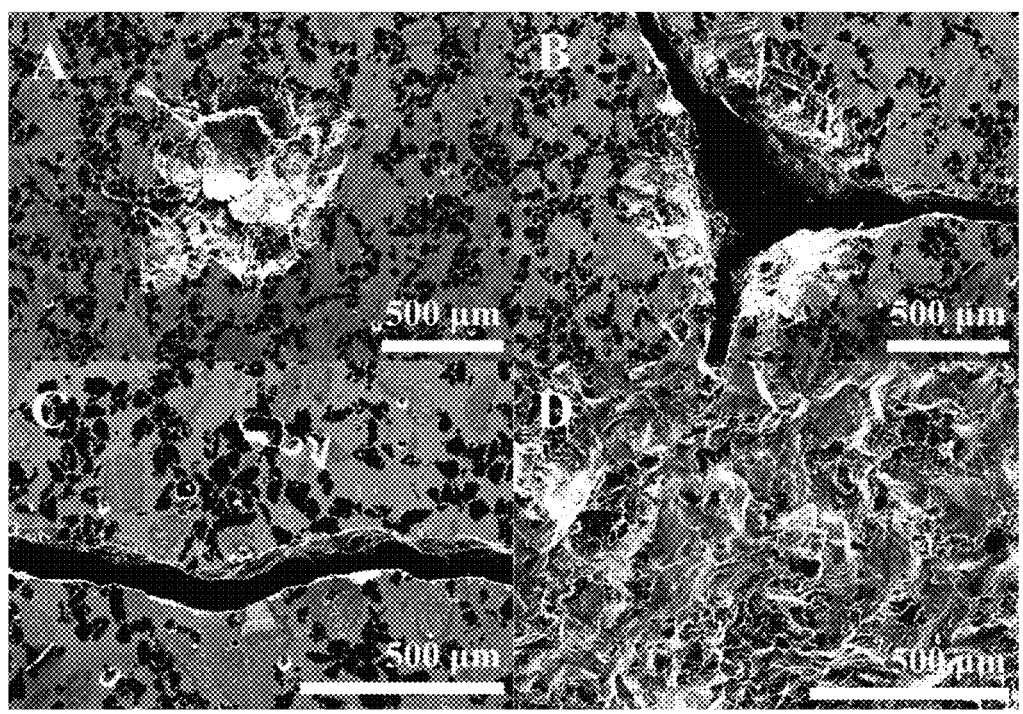
FIGS. 7A-7D show the results of a Rockwell C hardness test performed on the SiC—$B_4C$—Si composite to encompass all phases under one indent to improve the contact area for a bulk hardness value. A typical Rockwell C indent on the composite is shown in FIG. 7A; an indent that caused fracture is shown in FIG. 7B; an indent that caused crack propagation is shown in FIG. 7C; and the fracture surface is shown in FIG. 7D.

Rockwell C hardness was also performed on the SiC—$B_4C$—Si composite to encompass all phases under one indent to improve the contact area for a bulk hardness value. A typical Rockwell C indent on the composite is shown in FIG. 7A; an indent that caused fracture is shown in FIG. 7B; an indent that caused crack propagation is shown in FIG. 7C; and the fracture surface is shown in FIG. 7D. A Rockwell C hardness indent (cone shape of 120°) on the SiC—$B_4C$—Si composite is shown in FIG. 7A, and the value is 36 HRC, which was roughly 3.14 GPa when converting using charts for steels (e.g., V. D. Kal'ner and F. I. Shor, "Hardness conversion tables," *Met. Sci. Heat Treat.*, vol. 19, no. 9, pp. 801-803, September 1977). This was lower than the smallest values of the phases measured with Vickers. This means the composite hardness did not follow a rule of mixtures, but rather most likely depended on the interfaces and bonds of the composite as well as sizing effects. It is well known that changing the Hertzian contact and area of the indent affects the measured hardness in ceramics (e.g., A. A. Wereszczak et al., *Int. J. Appl. Glas. Sci.*, 1(2), 143-150, June 2010). The low Rockwell C hardness value in the present research is anomalous, so WC—Co samples with 20 wt. % Co and ~7-micron grains were tested for Rockwell C and Vickers hardness to investigate differences. There was a minimal difference of ~1% between the Rockwell C and Vickers readings for the WC—Co when using the steel conversion tables, so the effect observed in the SiC—$B_4C$—Si composites appears to arise from the Si matrix bonding or other composite effects.

Most of the Rockwell C indents resembled FIG. 7A, where the indenter encompasses all the phases with only small extending cracks. There was one indent shown in FIG. 7B that cracked the part entirely, and there were three cracks extending outward. FIG. 7C shows the crack propagation, and it is mostly through Si phase with some deflection around both $B_4C$ and SiC particles, which is likely a result of the fracture toughness of Si being much lower than SiC and $B_4C$ (e.g., A. M. Fitzgerald et al., *Sensors Actuators, A Phys.*, vol. 83, no. 1, 194-199, May 2000). FIG. 7D is a small piece of the cross section of a fracture surface form a fracture part during Rockwell C testing, and it shows some cleavage of the larger particles and some ridging.

TABLE 3

Hardness values of matrix and reinforcement done with Vickers Hardness indentation and Rockwell C where Vickers Hardness measurements are converted to GPa based on dimensional analysis and Rockwell C measurements are converted using steel charts.

| | Phase | | |
|---|---|---|---|
| | $B_4C$ particles | SiC particles | Si matrix |
| Vickers hardness on phases (Vickers, GPa) | 3250 ± 40, 31.8 ± 0.4 | 2700 ± 50, 26.48 ± 0.5 | 940 ± 30, 9.2 ± 0.3 |
| Rockwell C hardness on composite (HRC, GPa) | | 36 ± 2.4, 3.4 ± 0.2 | |

FIGS. 8A-8D show nano-indents across the interfaces of each of the particles with the Si matrix as well as the hardness values. More specifically, FIG. 8A shows indents across the SiC—Si interface; FIG. 8B shows the indent hardness values of the SiC—Si interface; FIG. 8C shows indents across the $B_4C$—Si interface; and FIG. 8D shows the indent hardness values of the $B_4C$—Si interface. In FIG. 8A, the indents are numbered 1-21, and there is a distinct decrease in hardness values (FIG. 8B) across the interface except for indents 16 (~15 GPa) and 26 (~13 GPa), which encompassed some SiC and some Si. Indent 19 did not occur as there was an error in data collection. In comparison, a similar scan across the $B_4C$—Si interface was performed. FIG. 8C shows the indents across the $B_4C$—Si interface, and FIG. 8D shows the hardness values. There is also a distinct decrease in hardness across the interface, but indents that are on the interface (such as indent 12 in FIG. 8C) retain the hardness value of the particle. This is different compared to indents on the interface of SiC—Si, where there is an intermediate hardness value for indents at the interface. This difference could be due to the chemical bonding behavior seen at the $B_4C$—Si interface compared to a more mechanical interface in the SiC—Si interface.

Figures 9A, 9B:
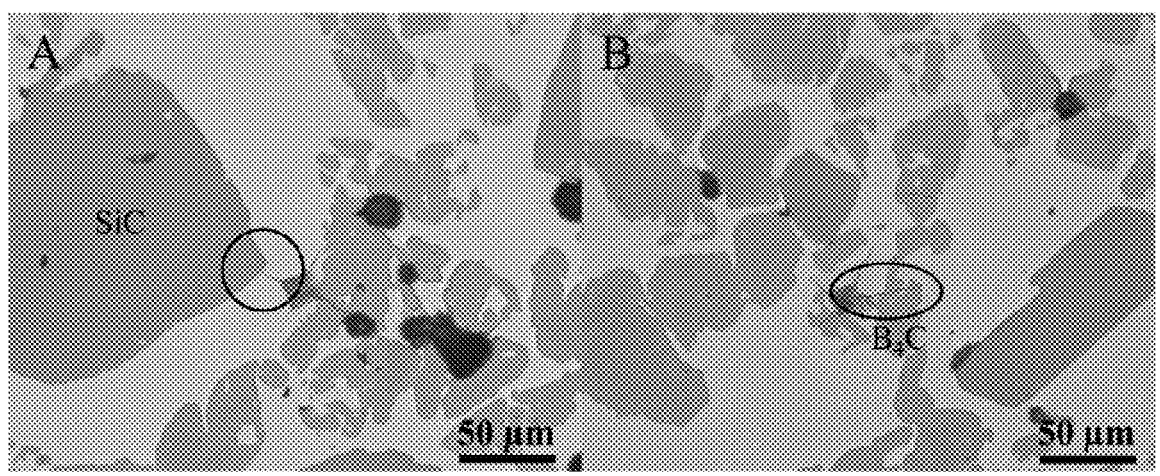
FIGS. 9A and 9B are images showing the matrix and particle interface behavior with crack propagation from Vickers microhardness indents.

FIGS. 9A and 9B show the matrix and particle interface behavior with crack propagation from Vickers microhardness indents. The indents were deliberately performed in the matrix to induce cracking toward the particle interface, as described in R. W. Rice et al., *J. Am. Ceram. Soc.*, 77(10), 2539-2553, October 1994; no hardness values were extracted from this analysis. FIG. 9A shows a typical SiC—Si interface from the present research, and the cracks mostly stop, blunt, or deflect. This indicates that the interface is not intimate, and the bonding of the SiC—Si interface is mostly a mechanical bond even though the STEM of the interface in FIG. 5A appears to be very intimate. FIG. 9B shows a typical $B_4C$—Si interface from the present research, and the cracks mostly propagate through $B_4C$ particles, indicating that the interface is more intimate, which may result from the chemical bonding around the $B_4C$ particles from the formation of the ternary phase (($B_{12}$(B, C, $Si)_3$)).

Discussion of the Results

Silicon did not fully infiltrate nor consolidate SiC due to a lack of a carbon source. The Si infiltration into the SiC—$B_4C$ printed preforms was successful with excellent shape retention that is within 1-2% of the preform geometry. The microstructure contains the three original phases SiC, $B_4C$, and Si, but also includes a ternary phase (($B_{12}$(B, C, $Si)_3$)) around $B_4C$. This ternary phase reaction and the extra carbon from the $B_4C$ addition are two key factors permitting the successful infiltration and processing of these composites as demonstrated herein.

Hardness values measured directly on single particles (both with Vickers and nano-indentation) are near that of the bulk material, but the Rockwell C values measured on a collection of particles and matrix are much lower than the softest constituent, Si, which does not follow the rule of mixtures. This may be due to three factors: size and scaling effects, both with particle size and indenter size, lack of hardness conversion tables for ceramics, and the mechanical bond between SiC and Si. The size of the indenter is most likely not the source of the anomaly because the hardness of the WC—Co resulted in roughly the same values with Rockwell C and Vickers Microhardness, but the particle size may play a role in the differences. The WC—Co grains (~7 micron) are much smaller than the SiC (150 micron) and $B_4C$ (70 micron) grains, and the hardness is known to decrease and become more variable with larger grains (R. W. Rice et al., *J. Am. Ceram. Soc.*, 77(10), 2539-2553, October 1994). Another factor affecting the anomalously low Rockwell C hardness values in the SiC—$B_4C$—Si composites is that conversion tables for steels were used because there is a lack of hardness conversion tables for ceramics. Even though it worked well with WC—Co, it may not work as well with other materials, especially composites with high vol. % of brittle matrix such as Si (i.e. the present research). The last and most important factor affecting the anomalously low Rockwell C hardness values in the SiC—$B_4C$—Si composites is the bond between the SiC particles and Si matrix, which was mostly a mechanical bond from the analyses on nano-indentation in FIGS. 8A-8D. and cracking behavior in FIGS. 9A-9B. Similar behavior is seen in CMCs of SiC/SiC because of the soft interface between fibers and matrix material. Hardness values on a collection of fibers and matrix showed a decrease in hardness because of soft interface coating on the fibers (A. Demir, *J. Eur. Ceram. Soc.*, 32(7), 1405-1411, June 2012. Also, fiber movement during hardness testing due to the soft interface of pyrolytic carbon interface layer, similar to what occurs during fiber loading, permitted SiC fibers to expand into the interface during the indentation, which caused low hardness values (D. Frazer et al., *Compos. Part A Appl. Sci. Manuf*, vol. 70, 93-101, 2015).

In summary, a blend of $B_4C$ and SiC powders was shaped via binder jet additive manufacturing into SiC—$B_4C$ preforms, which were subsequently melt-infiltrated with Si to form near-net-shape SiC—$B_4C$—Si composites. The retention of carbon when $B_4C$ is added to SiC results in successful Si infiltration. The SiC—$B_4C$—Si composites resulted in <1% dimensional change from printed to fully infiltrated and were nearly fully dense (98.4% TD), which was only achievable with the addition of $B_4C$ particles. The composite also includes a rim ternary phase on the $B_4C$, which helps the bonding of Si to $B_4C$ particles. There is no reaction zone between SiC particles and Si, which is the critical interface for consolidating the SiC—$B_4C$—Si composite. The hardness of the composite is lower than each constituent phase, and the fracture is mostly through the Si phase. These parts exemplify what the binder jet process and infiltration can achieve with different materials and can augment the production of armor and wear parts because of the results of near-net shaping, full density, and adequate properties at potentially lower costs, higher throughput, and controlled geometry.

Here, the mixed carbide powders were binder jet printed and subsequently melt infiltrated with Si under pressureless conditions. The addition of $B_4C$ aided in Si infiltration to make a highly dense composite. The microstructure, phase identification, and hardness of the composites processed were examined. The measured hardness values of each constituent matched the bulk values, but the macro-hardness did not follow the rule of mixtures due to less chemical and more mechanical contact of Si and SiC compared to the contact between $B_4C$ and Si. Other factors affecting this hardness difference include the lack of hardness conversion charts for ceramics, a scaling effect seen with hardness data on varying area of indentation and particle sizes, and the bonding between SiC and Si. This work demonstrated that binder jet additive manufacturing with pressureless infiltration provides a particularly effective method to shape reaction-bonded ceramics with limited shrinkage, high density, high throughput, and controlled geometries.

While there have been shown and described what are at present considered the preferred embodiments of the invention, those skilled in the art may make various changes and modifications which remain within the scope of the invention defined by the appended claims.

What is claimed is:

1. A method for indirect additive manufacturing of an object constructed of boron carbide, silicon carbide, and free silicon, the method comprising:
    (i) producing a porous preform constructed of boron carbide and silicon carbide by an indirect ceramic additive manufacturing (ICAM) process in which particles of a powder mixture containing boron carbide and silicon carbide particles become bonded together with an organic binder to construct the porous preform, wherein said powder mixture comprises: a) boron carbide particles having a size of at least 5 microns and no more than 120 microns, and b) silicon carbide particles having a size of at least 50 microns and no more than 500 microns, wherein at least 80 vol % of the silicon carbide particles are larger than the boron carbide particles; and wherein the boron carbide and silicon carbide particles are each included in an amount of 40-60 wt. % by weight of the powder mixture, provided that the foregoing amounts sum to at least 95 wt. %;
    (ii) subjecting said porous preform to a temperature of 500-900° C. to volatilize said organic binder to produce a binder-free porous preform; and
    (iii) infiltrating molten silicon into pores of said binder-free or sintered porous preform to produce said object constructed of boron carbide, silicon carbide, and free silicon, wherein step (iii) is conducted under an atmosphere containing 1-5% hydrogen gas admixed with argon gas.

2. The method of claim 1, further comprising, after step (ii) and before step (iii), sintering said binder-free porous preform at a temperature of 1800-2200° C. to produce a sintered porous preform.

3. The method of claim 1, wherein said ICAM process is a binder jetting process.

4. The method of claim 3, wherein said binder jetting process produces the porous preform in step (i) by separately feeding said powder mixture and an organic binder into a binder jetting manufacturing device, and dispensing selectively positioned droplets of said organic binder from a printhead of said binder jetting manufacturing device into a bed of said powder mixture to bind particles of said powder mixture with said organic binder to form said porous preform.

5. The method of claim 4, further comprising, after producing the porous preform by the binder jetting process in step (i), and before step (ii), subjecting the porous preform to a curing step at a temperature of 50-250° C. to at least partially vaporize or cure the organic binder.

6. The method of claim 1, wherein the infiltrating step (iii) comprises resting the binder-free porous preform on a bed of silicon powder, while said binder-free porous preform and bed of silicon powder are within a temperature-controlled enclosure, and raising the temperature of the enclosure to at least 1450° C. during the infiltrating process to result in melting of the silicon powder and infiltration of the silicon into pores of the binder-free porous preform by capillary action.

7. The method of claim 6, wherein the silicon powder is included in an amount that is substantially equivalent to the pore space present in the binder-free porous preform.

8. The method of claim 1, wherein the infiltrating step (iii) is conducted under an argon atmosphere or vacuum.

9. The method of claim 1, wherein said boron carbide particles have a size of 5-100 microns.

10. The method of claim 1, wherein said silicon carbide particles have a size of 50-200 microns.

11. The method of claim 1, wherein at least 90% of the silicon carbide particles are larger than the boron carbide particles.

12. The method of claim 1, wherein at least 75% of the silicon carbide particles are at least three times the size of the boron carbide particles.

13. The method of claim 1, wherein the binder-free porous preform produced in step (ii) contains residual carbon produced by volatilization of the organic binder in step (ii).

14. The method of claim 1, wherein the binder-free porous preform contains substantially no residual carbon produced by volatilization of the organic binder in step (ii).

15. The method of claim 1, further comprising cooling the object produced in step (iii) to result in solidification of said silicon in said object constructed of boron carbide, silicon carbide, and free silicon.

16. The method of claim 1, wherein the object constructed of boron carbide, silicon carbide, and free silicon, as produced in step (iii), includes a ternary phase containing boron, silicon, and carbon.

17. The method of claim 1, wherein the object constructed of boron carbide, silicon carbide, and free silicon, as produced in step (iii), has a density of at least 2.5 $g/cm^3$.

18. The method of claim 1, wherein, in step (i), the boron carbide and silicon carbide particles are each included in an amount of about 50 wt. % by weight of the powder mixture.

19. The method of claim 1, wherein, in step (iii), the molten silicon and binder-free porous preform are maintained at a temperature of 1450° C.-1700° C. during the infiltrating process.

* * * * *